Jan. 1, 1952  L. McNEELY  2,581,122
AIR CONDITIONING
Filed Aug. 14, 1948  2 SHEETS—SHEET 1

INVENTOR.
Lowell McNeely
BY Oliver S. Titcomb
his ATTORNEY

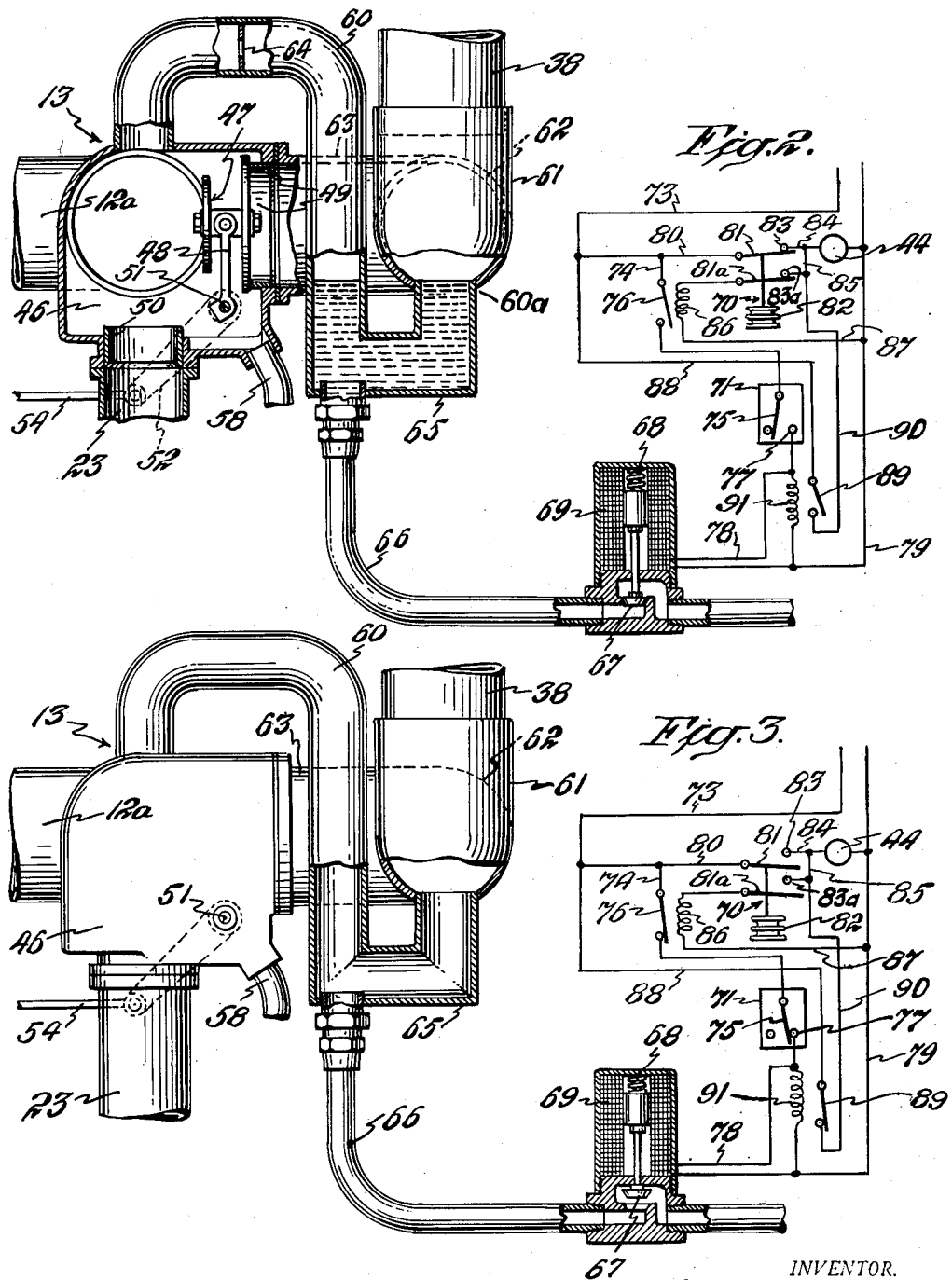

Patented Jan. 1, 1952

2,581,122

UNITED STATES PATENT OFFICE 2,581,122

AIR CONDITIONING

Lowell McNeely, Evansville, Ind., assignor to Servel, Inc., New York, N. Y., a corporation of Delaware Application August 14, 1948, Serial No. 44,381

15 Claims. (Cl. 257—3)

The present invention relates to air conditioning apparatus for cooling or heating the air in an enclosure and more particularly to an arrangement for simultaneously dehumidifying the air by cooling and reheating the dehumidified air.

The present invention is adapted for use with and constitutes an improvement in an air conditioning apparatus and controls of the type illustrated and described in United States Letters Patent to Sven W. E. Andersson, No. 2,486,908, issued November 1, 1949 and entitled Air Conditioning. The air conditioning apparatus illustrated in the said prior application comprises a heating system, a heat operated refrigeration system, a source of heating medium and a valve for directing heating medium from said source to either the refrigeration system or heating system, respectively. A selective control operates the valve to select the heating system or refrigeration system for operation and a thermostat responsive to the temperature of the ambient in the enclosure regulates the operation of the selected system.

An auxiliary control is also provided for adjusting the valve to simultaneously supply heat to both the refrigeration and heating systems to dehumidify the air by cooling and reheat the dehumidified air. While such an arrangement operates satisfactorily, it is difficult to adjust the valve to obtain the desired nicety of division of heating medium between the heating and refrigeration systems. Also the control is quite complicated and the arrangement requires an additional motor to adjust the valve between heating and cooling positions.

One of the objects of the present invention is to provide a reheat arrangement in an air conditioning apparatus of the type indicated which insures a predetermined division of the heating medium between the refrigeration and heating systems.

Another object is to provide an arrangement in an air conditioning apparatus of the type indicated for supplying heating medium to the heating system through one path to heat the air in an enclosure and through another path to reheat air dehumidified by the refrigeration system.

Another object is to provide conduit means including a selective valve for directing steam to either the heating system or refrigeration system and a by-pass with a reheat control valve for delivering steam to the heating system simultaneously with its delivery to the refrigeration system.

Another object is to provide a reheat control valve in the form of a liquid trap in the by-pass conduit which utilizes condensate from the heating system to close the conduit.

Another object is to provide a drain from the liquid trap in the by-pass conduit together with means for closing the drain to fill the trap with condensate and close the conduit or open the drain to draw off condensate and open the conduit.

Another object is to provide a thermostat and humidistat connected for joint operation to open the drain when the temperature is below a predetermined value and the humidity is above a predetermined value.

Still another object is to provide a reheat control arrangement which is of relatively simple construction, economical to manufacture and dependable in operation.

These and other objects will become more apparent from the following description and drawings in which like reference characters denote like parts throughout the several views. It is to be understood, however, that the drawings are for the purpose of illustration only and do not limit the scope of the invention, reference being had for this purpose to the appended claims. In the drawings:

Fig. 2 is an enlarged view of the reheat control arrangement showing the liquid trap in the by-pass conduit filled with condensate to close the conduit, and Fig. 3 is a view similar to Fig. 2 showing the drain open to draw off condensate and open the by-pass conduit.

Figure 1:
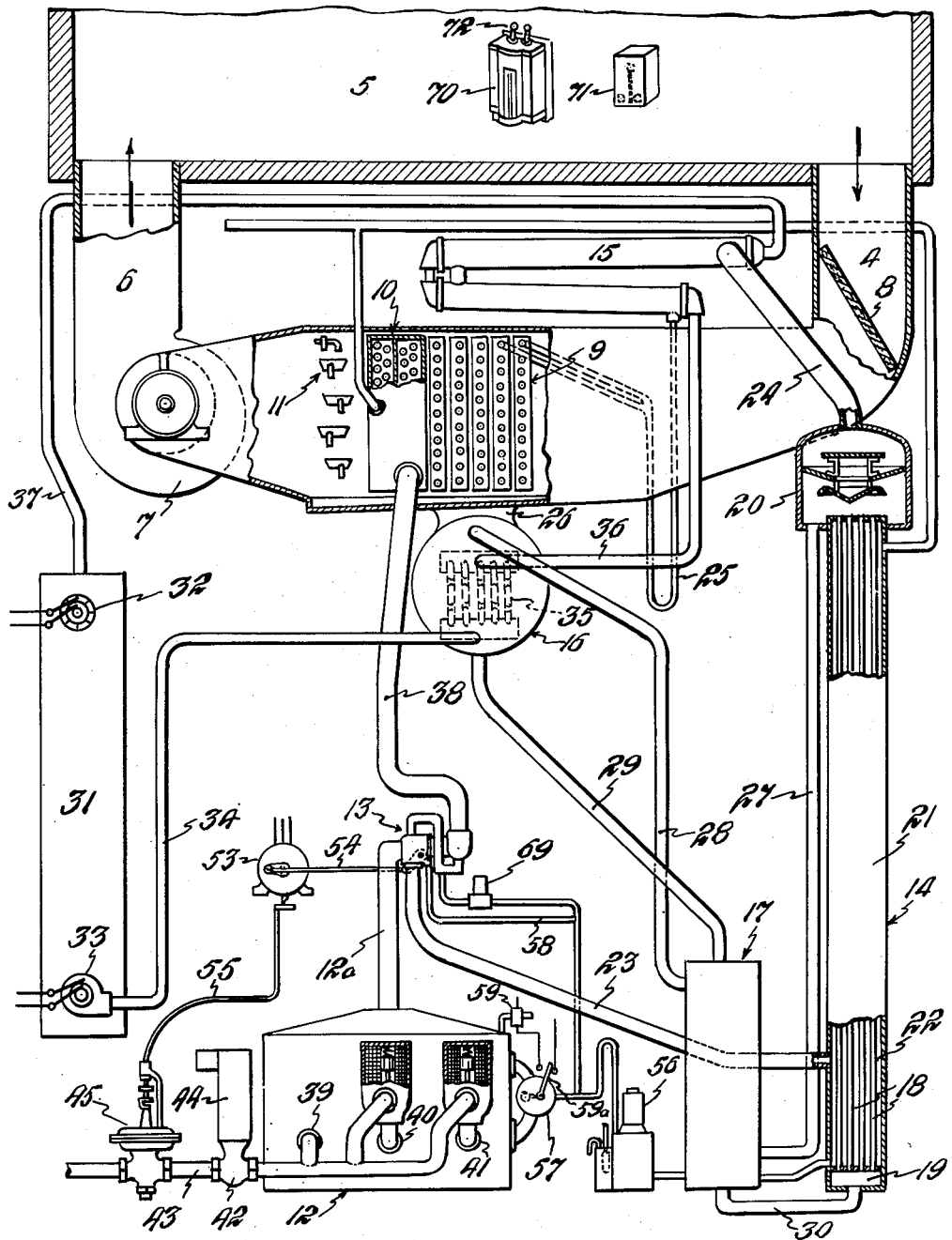
Fig. 1 is a diagrammatic view of an absorption refrigeration system incorporation the reheat arrangement of the present invention.

The air conditioning apparatus to which the present invention is shown applied is generally similar to that illustrated and described in U. S. Patent No. 2,486,908, referred to above. Suffice it to state herein that the air conditioning apparatus comprises a duct 4 for receiving air from the enclosure 5 to be conditioned and a duct 6 for delivering air to the enclosure. The air to be conditioned is circulated through the ducts 4 and 6 in the direction indicated by the arrows by means of an electric motor operated blower 7. As the air flows through the duct 4 it is conditioned by elements therein comprising a filter 8, a cooling element 9, a heating element 10 and humidifier 11. The cooling element 9 constitutes the evaporator of a heat operated absorption refrigeration system while the heating element 10 constitutes the radiator of a heating system. Both the refrigeration system and heating system are selectively supplied with a suitable heating medium, such as steam, from any suitable source and as illustrated the source of steam is a boiler 12. The heating steam is directed to either the refrigeration system or the heating system by a diverter valve 13, later to be described in detail.

The heat operated refrigeration system preferably is of the type which operates in a partial vacuum and utilizes water as a refrigerant and a salt solution as an absorbent. The refrigeration system comprises a generator 14, a condenser 15, evaporator 9, an absorber 16 and heat exchanger 17 interconnected to provide a closed circuit. The generator 14 comprises a series of upright tubes 18 connected at their lower end to an inlet chamber 19 for absorption solution and connected at their upper ends to a separating chamber 20. Surrounding the tubes 18 is a jacket 21 providing a heating chamber 22 therebetween.

Steam is supplied from the boiler 12 to the heating chamber 22 of the generator 14 through a steam main 12a, diverter valve 13 and conduit 23. Heat from the steam is transmitted through the tubes 18 to expel refrigerant vapor from absorption solution therein and the vapor rises upwardly through the tubes at considerable velocity and raises the absorption solution at the sides of the tubes by a climbing film vapor lift action. The refrigerant vapor flows from the separating chamber 20 to the condenser 15 through a conduit 24 and the liquefied refrigerant flows from the condenser through a U-shaped conduit 25, or any other suitable means for maintaining the difference in pressure, to the evaporator or cooling element 9. Refrigerant vapor flows from the evaporator 9 through passages or headers 26 to the absorber 16.

Absorption solution weak in refrigerant or, in other words, a concentrated salt solution flows by gravity from the separating chamber 20 to the top of the absorber 16 in a path of flow including the conduit 27, heat exchanger 17 and conduit 28. The solution in the absorber 16 absorbs refrigerant vapor and this solution strong in refrigerant or, in other words, dilute salt solution flows by gravity from the bottom of the absorber 16 to the inlet chamber 19 at the bottom of the generator 14 in a path of flow including the conduit 29, heat exchanger 17 and conduit 30. The absorption of refrigerant vapor in the absorber 16 maintains a relatively low pressure in the evaporator 9 so that the refrigerant evaporates at a low temperature to produce a refrigerating effect and the low pressure in the evaporator and absorber is maintained by liquid columns in conduits 25, 28 and 29.

The absorber 16 and condenser 15 are cooled by cooling water from any suitable source such as the cooling tower 31 illustrated in Fig. 1 of the drawings. An electric motor driven fan 32 produces a flow of air upwardly through the cooling tower 31 and an electric motor driven pump 33 at the bottom of the tower circulates cooled water through the absorber 16 and condenser 15 of the refrigeration system. The path of flow of the cooling water includes the conduit 34, cooling coils 35 in the absorber 16, conduit 36, condenser 15 and conduit 37 back to the top of the cooling tower.

The heating system comprises the radiator 10 and a conduit 38 connecting the diverter valve 13 to the radiator.

The boiler 12 may be heated by any suitable type of fluid fuel burners, such as the plurality of gas burners 39, 40 and 41 illustrated in Fig. 1. The flow of fuel to the burners 39, 40 and 41 is preferably controlled by a master valve 42 in the fuel supply line 43 and operated by an electric motor 44 and by individual magnetically operated control valves. For purpose of description it will be considered that the supply of fuel to all of the burners 39, 40 and 41 is controlled by the valve 42. As more heat may be required by the heating system to heat the air than is required by the refrigeration system to cool the air, an adjustable gas pressure regulator 45 may be provided in the fuel supply line 43.

Steam generated in the boiler 12 is delivered through the steam main 12a to the diverter valve 13 where it is delivered to either the heating system or the heat operated refrigeration system. As illustrated most clearly in Fig. 2 the diverter valve 13 comprises a valve body constituting a steam chamber 46 and a valve head 47 mounted on a crank arm 48 to adapt it to cooperate with a valve port 49 connected to the conduit 38 or with a valve port 50 connected to the conduit 23. The crank arm 48 is mounted fast on a shaft 51 having a crank arm 52 at the outside of the casing. The valve head 47 may be shifted manually by actuating the crank arm 52 but as illustrated the crank arm 52 is connected to a motor 53 through a link 54. Rotation of the motor 53 through half a revolution moves the valve head 47 through an angle of 90° to close one port 49 or 50 and open the other port. Motion is also transmitted from the motor 53 through a Boden wire drive 55 to adjust the gas pressure regulator 45 simultaneously with adjustment of the diverter valve 13 for a heating or cooling operation, respectively.

Thus, with the diverter valve head 47 in the position illustrated in Fig. 2 all of the steam generated in the boiler 12 is delivered through the conduit 23 to the generator 14 of the refrigeration system. When the valve head 47 is moved into engagement with the port 50 all of the steam is delivered through the conduit 38 to the heating element 10. Condensate from the heating chamber 22 of the generator 14 is returned by a condensate pump 56 to a connection 57 at the side of the boiler 12. Condensate from the heating radiator 10 flows back through the conduit 38 to the chamber 46 of the diverter valve 13 and through a drain tube 58 to the boiler 12. Make-up water is supplied to the boiler 12 through a supply pipe controlled by an electro-magnetically operated valve 59 and a float operated switch 59a. The operation of the various elements of the air conditioning apparatus is regulated by suitable control means such as the electric control circuits illustrated in U. S. Patent No. 2,486,908, referred to above, and which may be considered as incorporated herein. As thus far described the air conditioning apparatus is substantially identical with that illustrated in said Andersson application.

In accordance with the present invention a novel arrangement is provided for directing steam from said boiler 12 to both the refrigeration system and heating system simultaneously to dehumidify the air by cooling and reheat the dehumidified air. The reheat arrangement comprises a path of flow separate from the normal path for delivering steam to the heating system together with a flow controlling valve means in the separate path. In the illustrated embodiment the separate path comprises a by-pass conduit 60 connecting the chamber 46 of the diverter valve 13 to the conduit 38 at a point beyond the valve seat 49. As shown in detail in Fig. 2 the lower end of the conduit 38 comprises an elbow 61, a rearwardly extending pipe section 62 and a laterally extending pipe section 63 connected to the valve seat 49. While the by-pass conduit 60 may take other forms, it is shown connected between the top of the valve chamber 46 and the bottom of the elbow 61 for a reason as will later appear.

The by-pass conduit 60 may have such a cross-sectional area relative to the cross-sectional area of the conduit 23 as to produce the desired division of steam between the refrigeration system and heating system to dehumidify the air by cooling and reheat the dehumidified air to substantially the same temperature at which it enters the conditioning chamber. As shown in Fig. 2 the by-pass conduit 60 is made larger than necessary to deliver the desired amount of steam to the heating element or radiator 10 and a measuring orifice 64 is provided in the conduit for passing the predetermined quantity of steam necessary to reheat the dehumidified air to its initial temperature.

The valve means in the by-pass conduit 60 also may take other forms but preferably comprises a liquid trap for opening or closing the conduit. The liquid trap is formed by a U-shaped portion 65 of the by-pass conduit 60 depending from the end 60a connected to the elbow 61 of the conduit 38. The end 60a of the by-pass conduit 60 is positioned directly under the downwardly directed portion of the conduit 38 to adapt it to receive all condensate returning from the heating element or radiator 10. A drain tube 66 connects the bottom of the trap 65 to the boiler connection 57, see Fig. 1, and the opening or closing of the by-pass conduit 60 by condensate in the liquid trap is controlled by a valve 67 in the drain tube. When the valve 67 is closed, as illustrated in Fig. 2, condensate from the heating element 10 accumulates in the depending U-shaped portion 65 of the by-pass conduit 60 until it closes the conduit. When the valve is open as illustrated in Fig. 3 the condensate drains from the liquid trap 65 to open the by-pass conduit 60 and permits the flow of steam to the heating element 10.

Valve 67 may be of any suitable type for closing the drain tube 66 and in the illustrated embodiment comprises a self-contained unit including a spring 68 for closing the valve and an electro-magnet coil 69 for opening the valve. Coil 69 is connected in an electric control circuit including a thermostat 70 and a humidistate 71 connected for joint operation to open the valve when the temperature is below a predetermined value and the humidity is above a predetermined value. The control circuit illustrated regulates only the refrigeration system and valve means in the by-pass conduit 60 but it will be understood that a control circuit would be provided for regulating the complete air conditioning apparatus. Suffice it to state herein that such a control circuit may comprise a two position reversing switch 72 on the thermostat 70 adapted for operation manually, see Fig. 1, or automatically for energizing the motor 53 to select the heating system or refrigeration system for operation and connect branch circuits for energization by the thermostat to regulate the operation of the selected system.

The portion of the control circuit for regulating the refrigeration system and reheat arrangement comprises a conductor 73 from the selective switch 72, see Fig. 2, a branch conductor 74 connected to a movable contact 75 of the humidistat 71 and including a relay switch 76. The humidistat 71 is so constructed and arranged as to actuate the movable contact 75 to open position when the humidity is low as illustrated in Fig. 2 and engage the movable contact with a fixed contact 77 when the humidity is high as illustrated in Fig. 3. Fixed contact 77 is connected to one side of the electro-magnet coil 69 by conductor 78 and the opposite side of the coil is connected to a return conductor 79. A second branch from the conductor 73 comprises a conductor 80 connected to a movable contact 81 of the thermostat 70. When the air in the enclosure is above a predetermined temperature a thermal responsive element 82 moves the contact 81 into engagement with fixed contact 83 connected by a conductor 84 to the electric motor 44 for operating the fuel valve 42. The opposite side of the motor 44 is connected to the return conductor 79. A conductor 85 also connects conductor 84 to a second switch contact 81a of thermostat 70 to simultaneously complete a circuit through a relay coil 86 for switch 76 connected in parallel with the valve motor 44. The circuit for the relay coil 86 is completed from the switch contact 81a to one side of the coil and from the other side of the coil to the return 79 by a conductor 87. A third branch from conductor 73 comprises a conductor 88, a relay switch 89 and a conductor 90 to conductor 85 and movable switch contact 81a of the thermostat 70. Switch 89 is normally biased to open position and actuated to closed position by a relay coil 91 connected between fixed contact 77 of the humidistat 71 and return conductor 79 and in parallel with the electro-magnet coil 69 for actuating the valve 67. One form of the invention having now been described in detail the mode of operation is explained as follows.

When the enclosure 5 is to be heated the diverter valve 13 is actuated either manually or automatically to engage the valve head 47 with the valve seat 50 and thereby close the conduit 23 to the generator 14 and open the conduit 38 to the heating element or radiator 10. The motor 44 is then energized to open fuel valve 42 and supply fuel to the burners 39, 40 and 41 to heat the boiler 12 and generate steam therein. Steam generated in the boiler 12 flows through the steam main 12a to the chamber 46 of the diverter valve 13 and through the port 49 and conduit 38 to the radiator 10. Some of the steam may flow through the by-pass conduit 60 at the beginning of a heating operation but condensate draining from the radiator 10 will soon fill the liquid trap 65 and close the by-pass conduit. When condensate in trap 65 rises to the level of the rearwardly extending portion 62 of conduit 38 it will overflow into the valve chamber 46 and flow back to the boiler 12 through the drain conduit 58. When steam is supplied to the heating element or radiator 10 the fan 7 is operated to draw air from the enclosure 5 through the duct 4 where it is filtered by the filter 8, heated by the radiator 10, humidified by the humidifier 11 and then returned to the enclosure through the duct 6. Preferably, the operation of the motor 44 for the fuel valve 42 and fan 7 is regulated automatically by a suitable control to maintain the air in the enclosure at a predetermined temperature.

When the enclosure is to be cooled the diverter valve head 47 is shifted, either manually or automatically, to the position illustrated in Fig. 2 to close port 49 to the heating element 10 and open port 50 to the generator 14 of the refrigeration system. Upon an increase in temperature in the enclosure 5, the thermal element 82 of the thermostat 70 will actuate the movable contacts 81 and 81a into engagement with the fixed contacts 83 and 83a to complete a circuit through conductors 73 and 80, switch contacts 81 and 83 to energize the motor 44 and open the fuel valve 42. With fuel supplied to the burners 39, 40 and 41 the boiler 12 is heated to generate steam therein. Simultaneously, a circuit is completed from conductor 84 through conductor 85, switch contacts 83a and 81a, relay coil 86 and conductors 87 and 79 to open relay switch 76, deenergize electromagnet coil 69 and close valve 67, if open, under the action of spring 68, see Fig. 2.

Steam generated in the boiler 12 is delivered through the main 12a, diverter valve 13 and conduit 23 to the generator 14. If the by-pass conduit 60 is open at the beginning of a cooling operation steam also will flow therethrough. However, after a short period of time condensate from the heating element 10 will fiill the liquid trap 65 and close the conduit. The steam supplied to the generator 14 will operate the refrigeration system to supply refrigerant to the evaporator 9 in the manner previously explained. When steam is delivered to the generator 14, operation of the blower 7 is initiated which draws air from the enclosure 5 and through the duct 4 where it is filtered by the filter 8, cooled by the cooling element 9 and then returned to the enclosure through the duct 6. A portion of the air directly contacting the evaporator 9 will be cooled below its dew point to remove moisture and thereby dehumidify as well as cool the air. The refrigeration system continues to operate until the temperature in the enclosure falls to the degree desired at which time the thermal element 82 of the thermostat 70 opens switch contacts 81 and 81a to deenergize fuel valve motor 44 and terminate a cooling cycle of operation. The refrigeration system is operated intermittently as regulated by the thermostat 70 to maintain the enclosure at the desired temperature.

When the humidity in the enclosure 5 is high and the temperature is satisfactory, both the refrigeration system and heating system are operated simultaneously to dehumidify the air by cooling and reheat the dehumidified air. Under such conditions the thermostatic switches 81 and 81a are open and the relay switch 76, humidity responsive switch 75 and relay switch 89 are closed as illustrated in Fig. 3. A circuit is then completed through conductors 73 and 74, relay switch 76, humidity responsive switch contacts 75 and 77 and then through the electro-magnet coil 69 and relay coil 91 arranged in parallel to the return conductor 79. Energization of coil 69 opens drain valve 67 against the action of spring 68. Condensate in the liquid trap 65 then flows by gravity through the drain tube 66 back to the boiler 12 and opens the by-pass conduit 60. The energization of the relay coil 91 closes relay switch 89 to complete a circuit from 73 through conductors 88, 90, 85, 84 and valve motor 44 to return conductor 79. Energization of motor 44 opens fuel valve 42 to generate steam in boiler 12. Open switch contact 81a prevents energization of relay coil 86.

Steam then flows from the boiler 12 through the steam main 12a to the chamber 46 of the diverter valve 13 where its flow is divided between the conduit 23 to the generator 14 of the refrigeration system and the by-pass conduit 60 and conduit 38 to the radiator 10 of the heating system. The blower 7 then draws air from the enclosure 5 through the duct 4 where it is successively cooled by the evaporator 9 and heated by the radiator 10 to dehumidify the air without substantially changing its temperature. The division of steam is accurately proportioned by the relative size of the valve port 50 and the orifice 64 in the by-pass conduit 60 to give the desired ratio of cooling and heating.

The apparatus continues to operate to dehumidify the air by cooling and reheat the dehumidified air until either the humidity decreases below a predetermined value or the temperature increases above a predetermined value. If the humidity decreases the humidity responsive switch 71 opens the circuit to the electro-magnetic actuating coil 69 and valve 67 is closed by spring 68. Upon deenergization of relay coil 91 switch 89 opens to deenergize motor 44 to close the fuel valve 42 and thereby stop the operation of the refrigeration system. If the temperature in the enclosure 5 increases above a predetermined value the thermal element 82 closes switch contacts 81 and 81a to complete a circuit through fuel valve motor 44 and relay coil 86 as previously explained. Energization of relay coil 86 opens relay switch 76 and deenergizes coil 69 which causes valve 67 to close under the action of spring 68. Condensate from the heating radiator 10 then closes by-pass conduit 60 and stops the reheating of the cooled air. Thus the apparatus operates to dehumidify the air by cooling and reheat the dehumidified air only when the temperature is below and the humidity is above permissible limits.

It will now be observed that the present invention provides a novel arrangement in a heat operated air conditioning apparatus for cooling or heating the air or simultaneously dehumidifying and reheating the air in an enclosure. It will also be observed that the present invention provides separate paths for directing heat from a source to the heating system with a novel valve arrangement for controlling the flow through said separate paths. It will still further be observed that the present invention provides an arrangement for dehumidifying the air in an enclosure by cooling and reheating the dehumidified air only when the temperature is low and the humidity is high.

While only a single embodiment of the invention is illustrated and described, it will be understood that modifications may be made in the construction and arrangement of parts without departing from the spirit or scope of the invention.

Therefore, without limitation in this respect, the invention is defined by the following claims.

I claim:

1. Air conditioning apparatus comprising a heating system having a heating element, a heat operated refrigeration system having a cooling element, a source of heating medium, conduit means including selective valve means providing separate paths for directing heating medium from said source to the heating system or to the heat operated refrigeration system, respectively, a conduit providing a second path for directing heating medium from said source to the heating element independently of the selective valve, and humidity controlled valve means controlling the flow of heating medium through said last named conduit for opening the second path to the heating element when the humidity is high whereby to supply heating medium to both the refrigeration system and heating element simultaneously to dehumidify the air by cooling and reheat the dehumidified air.

2. Air conditioning apparatus comprising a heating system having a heating element, a heat operated refrigeration system having a cooling element, a source of heating medium, conduit means providing inidividual paths for directing heating medium from said source to the heating system or to the heat operated refrigeration system, respectively, selective valve means in the conduit means for closing one path and opening the other path, a conduit providing a second path for directing heating medium from said source to the heating element independently of the selective valve means, and humidity controlled valve means for controlling the flow of heating medium through said last named conduit to open the second path when the first path is closed and the humidity is high to supply heating medium to both the refrigeration system and heating element simultaneously, said conduit being so constructed and arranged as to divide the heating medium between the refrigeration system and heating element to dehumidify the air by cooling and reheat the dehumidified air to its initial temperature.

3. Air conditioning apparatus comprising a heating system having a heating element, a heat operated refrigeration system having a cooling element, a source of heating medium, means including a selective valve for directing heating medium from said source to the heating system or to the heat operated refrigeration system, respectively, a conduit for directing heating medium from said source to the heating element independently of the selective valve, valve means for controlling the flow of heating medium through said conduit to supply heating medium to both the refrigeration system and heating element simultaneously, and an orifice in said conduit to divide the flow of heating medium between the refrigeration system and heating element to dehumidify the air by cooling and reheat the dehumidified air.

4. Air conditioning apparatus comprising a heating system having a heating element, a heat operated refrigeration system having a cooling element, a source of heating medium, a chamber connected to said source of heating medium, conduits connecting said chamber to the heating element and refrigeration system, respectively, a selective valve in said chamber shiftable from one to the other of two positions for closing one conduit and opening the other conduit, a conduit by-passing the selective valve to direct heating medium from the chamber to the heating element, and humidity responsive valve means for controlling the flow of heating medium through said by-pass conduit to open the latter when the humidity is high whereby to supply heat to both the refrigeration system and heating element simultaneously to dehumidify the air by cooling and reheat the dehumidified air.

5. Air conditioning apparatus comprising a heating system having a heating element, a heat operated refrigeration system having a cooling element, a source of heating medium, a chamber connected to said source of heating medium, conduits connecting said chamber to the heating system and refrigeration system, respectively, a selective valve in said chamber shiftable from one to the other of two positions for closing one conduit and opening the other conduit, a conduit by-passing the selective valve to direct heating medium from the chamber to the heating system, valve means for closing the by-pass conduit, and a humidistat for actuating the valve means to open the conduit when the humidity is high whereby to supply heat to both the refrigeration system and heating system simultaneously to dehumidify the air by cooling and reheat the dehumidified air.

6. Air conditioning apparatus comprising a heating system having a heating element, a heat operated refrigeration system having a cooling element and a heat receiving element, a source of heating medium, means including a selective valve for directing heating medium from said source to the heating system or to the heat receiving element of the refrigeration system, respectively, a conduit for directing heat from said source to the heating system independently of the selective valve means, a second valve means for closing the conduit, and control means including a thermostat and humidistat connected for joint operation to actuate the valve means and open the conduit when the temperature is below a predetermined value and the humidity is above a predetermined value whereby to dehumidify the air by cooling and reheat the dehumidified air.

7. Air conditioning apparatus comprising a heating system having a heating element, a heat operated refrigeration system having a cooling element and a heat receiving element, a source of steam, means including a selective valve for directing steam from said source to the heating system or heat receiving element of the refrigeration system, respectively, a conduit by-passing said selective valve for directing steam from said source to the heating element, valve means for closing the conduit, and humidity responsive control means for actuating the last named valve means to open the by-pass conduit when the selective valve is directing steam to the refrigeration system and the humidity is high to supply steam to the heating element and heat receiving element of the refrigeration system simultaneously whereby to dehumidify the air by cooling and reheat the dehumidified air.

8. Air conditioning apparatus comprising a heating system having a heating element, a heat operated refrigeration system having a cooling element and a heat receiving element, a steam boiler, a chamber connected to receive steam from said boiler, conduits connecting said chamber to the heating element and heat receiving element of the refrigeration system, respectively, selective valve means shiftable from one to the other of two positions for closing one conduit and opening the other conduit, a by-pass conduit connecting the chamber to the heating element around the selective valve means, a second valve means for closing the by-pass conduit, and control means including a thermostat and humidistat connected for joint operation to actuate the valve means to open the by-pass conduit when the temperature is below a predetermined value and the humidity is above a predetermined value to supply heat to both the refrigeration system and heating system simultaneously whereby to dehumidify the air by cooling and reheat the dehumidified air.

9. Air conditioning apparatus comprising a heating element for heating air to be conditioned, a source of steam at substantially atmospheric pressure, a conduit connecting said source of steam to the heating element, a mechanical valve for closing the conduit, a by-pass conduit around the valve for directing steam from said source to the heating element and arranged to receive condensate from the heating element, said by-pass conduit being formed to provide a liquid trap, a drain from the liquid trap, and control means for closing the drain to accumulate condensate in the trap and close the by-pass to prevent steam from flowing therethrough or open the drain to draw off condensate and open the conduit to permit steam to flow therethrough.

10. Air conditioning apparatus comprising a heat operated refrigeration system having a cooling element for cooling the air to be conditioned and a heat receiving element, a source of steam, a conduit for delivering steam from said source to the heat receiving element of the refrigeration system, a heating element for heating air to be conditioned, a conduit for delivering steam from said source to the heating element and arranged to receive condensate from the heating element, said conduit being formed to provide a liquid trap, a drain from the liquid trap, and control means for closing the drain to accumulate condensate in the liquid trap and close the conduit and open the drain to draw off condensate and open the conduit.

11. Air conditioning apparatus comprising a heating element, a heat operated refrigeration system having a cooling element, a source of steam, means for delivering steam from said source to the heating element or to the refrigeration system, respectively, a separate conduit connecting said source of heat to the heating element, and valve means in the conduit comprising a liquid trap, a drain from the liquid trap, and means for opening and closing the drain whereby to fill the liquid trap with condensate when the drain is closed to prevent the flow of steam to the heating element and draw off condensate from the trap when the drain is open to permit the flow of steam to the heating element and refrigeration system simultaneously.

12. Air conditioning apparatus comprising a heating system having a heating element, a heat operated refrigeration system having a cooling element and a heat receiving element, a source of steam, a conduit for delivering steam from said source to the heating system, a conduit for delivering steam from said source to the heat receiving element of the refrigeration system, a selective valve for opening one conduit and closing the other conduit, a by-pass conduit around said selective valve for delivering steam from said source to the heating system and arranged to receive condensate from the heating element, said by-pass conduit forming a liquid trap, a drain from said liquid trap, and a valve for closing the drain to fill the trap with condensate and prevent the flow of steam or opening the drain to draw off condensate and permit the flow of steam therethrough.

13. Air conditioning apparatus comprising a heat operated refrigeration system having a cooling element for cooling the air to be conditioned and a heat receiving element, a source of steam, a conduit for delivering steam from said source to the heat receiving element of the refrigeration system, a heating element for heating air to be conditioned, a conduit for delivering steam from said source to the heating element and arranged to receive condensate from the heating element, said conduit being formed to provide a liquid trap, a drain from the liquid trap, and a humidistat for opening the drain when the humidity is above a predetermined value to draw off the condensate and open the conduit whereby to dehumidify the air by cooling and reheat the dehumidified air.

14. Air conditioning apparatus comprising a heat operated refrigeration system having a cooling element for cooling the air to be conditioned and a heat receiving element, a source of steam, a conduit for delivering steam from said source to the heat receiving element of the refrigeration system, a heating element for heating air to be conditioned, a conduit for delivering steam from said source to the heating element and arranged to receive condensate from the heating element, said conduit being formed to provide a liquid trap for closing the conduit when filled with condensate, a drain from the liquid trap, a valve for closing the drain, an operating device for actuating the valve to open the drain, and an electric control circuit comprising a thermostat and humidistat connected to energize the operating device to open the valve when the temperature is below a predetermined value and the humidity is above a predetermined value.

15. Air conditioning apparatus comprising a heating system having a heating element, a heat operated refrigeration system having a cooling element and a heat receiving element, a source of steam, a conduit for delivering steam from said source to the heating system, a conduit for delivering steam from said source to the heat receiving element of the refrigeration system, a selective valve for opening one conduit and closing the other conduit, a by-pass conduit around said selective valve for delivering steam from said source to the heating system and receiving condensate from the heating system, said conduit being formed to provide a liquid trap, a drain from the liquid trap, a valve for closing the drain, an operating device for actuating the valve to open the drain, and an electric control circuit comprising a thermostat and humidistat connected to energize the operating device to open the valve when the temperature is below a predetermined value and the humidity is above a predetermined value whereby to dehumidify the air by cooling and reheat the dehumidified air.

LOWELL McNEELY.

REFERENCES CITED

The following references are of record in the file of this patent:

UNITED STATES PATENTS

| Number | Name | Date |
|---|---|---|
| 398,719 | Gold | Feb. 26, 1889 |
| 2,111,618 | Erbach | Mar. 22, 1938 |
| 2,311,711 | Thomas | Feb. 23, 1943 |
| 2,352,930 | Anderson | July 4, 1944 |
| 2,486,908 | Andersson | Nov. 1, 1949 |